No. 812,930. PATENTED FEB. 20, 1906.
G. W. KERR.
WIND SHIELD FOR VEHICLES.
APPLICATION FILED MAR. 1, 1905.
2 SHEETS—SHEET 1.
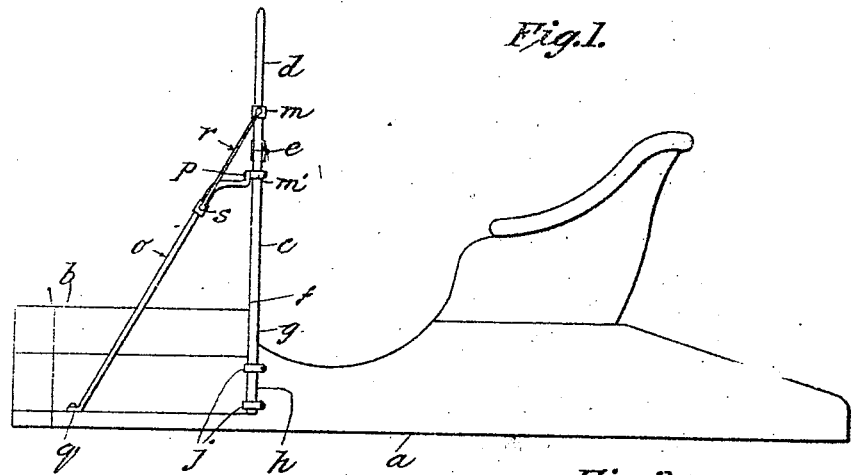
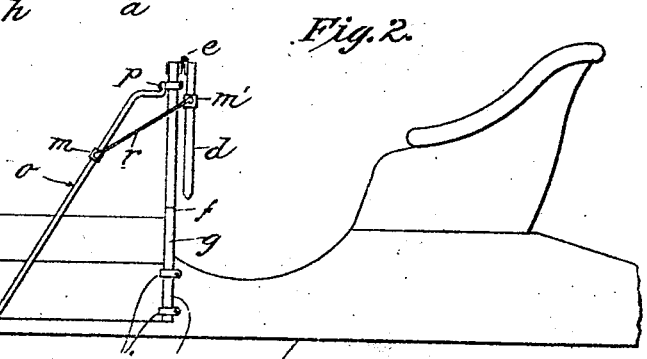
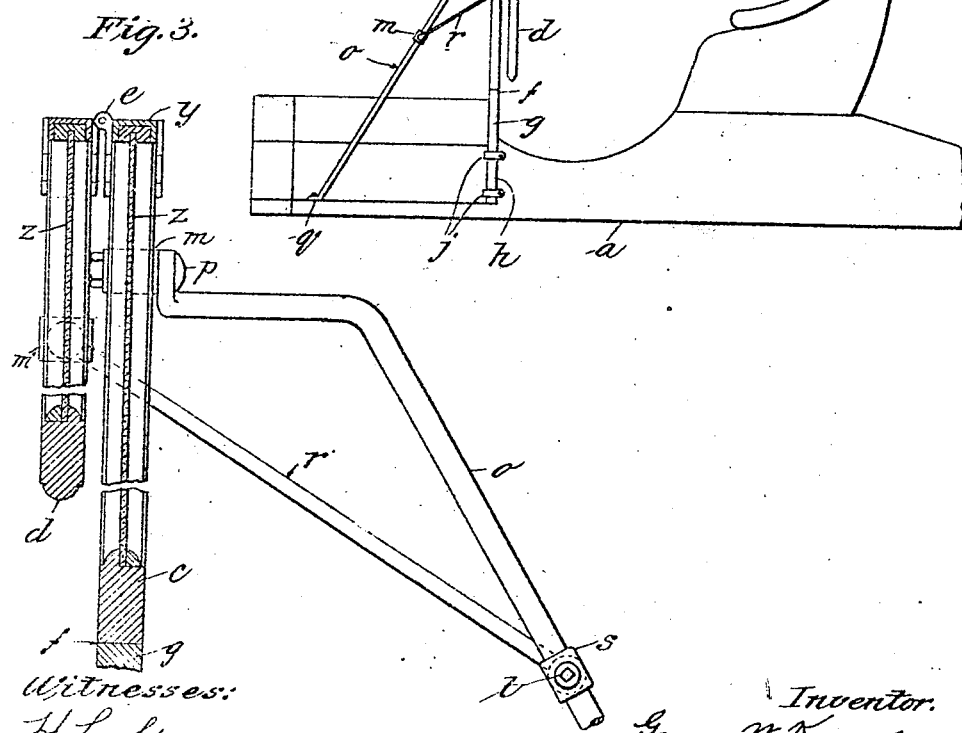

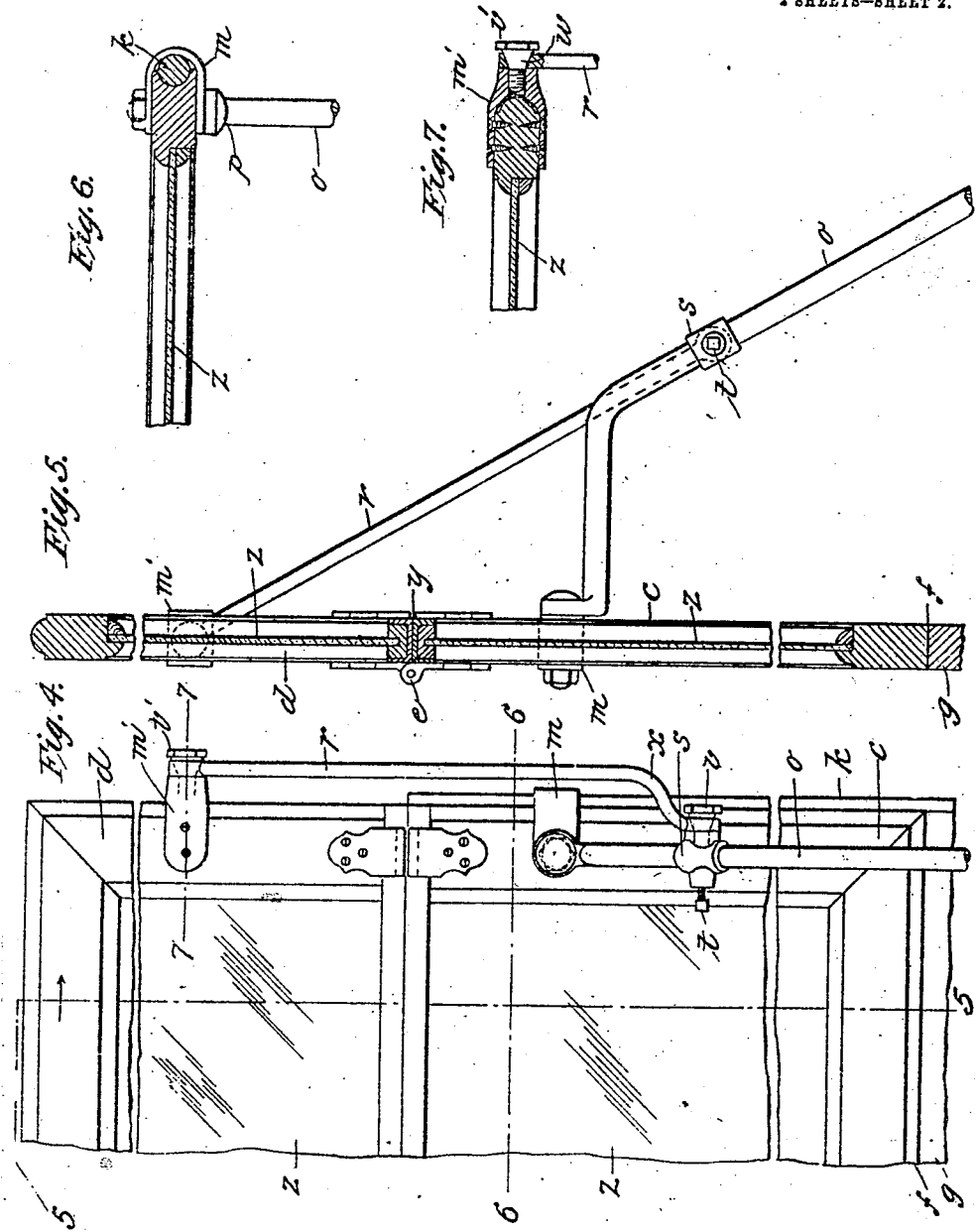

UNITED STATES PATENT OFFICE.

GEORGE W. KERR, OF SPRINGFIELD, MASSACHUSETTS.

WIND-SHIELD FOR VEHICLES.

No. 812,930.　　　Specification of Letters Patent.　　Patented Feb. 20, 1906.

Application filed March 1, 1905. Serial No. 247,921.

REISSUED

*To all whom it may concern:*

Be it known that I, GEORGE W. KERR, a citizen of the United States of America, residing at Springfield, in the county of Hampden and State of Massachusetts, have invented new and useful Improvements in Wind-Shields for Vehicles, of which the following is a specification.

This invention relates to wind-shields for use on vehicles; and it has particular reference to the construction of wind-shields for self-propelled vehicles and the like.

As ordinarily constructed, the shield consists of a glass plate removably supported on the vehicle near the forward end thereof to protect the operator or driver. When used on self-propelled road-vehicles of the type now in general use, the area of this frame is very considerable, and to make it effective when a canopy is used it is necessary to make it high enough to extend up under the forward end of said canopy. The area of a plate large enough to afford suitable protection is so great that there is no place to store it in the vehicle when taken down, and it is therefore frequently necessary to carry it when it is not needed and when, in fact, it shuts off all air-currents from the operator.

The object of the present invention is to obviate these disadvantages by the provision of a wind-shield of this type made in two parts, the upper portion of which may be swung down out of the way when not needed against the lower fixed portion of the shield, provision being made to secure the movable portion of the shield in either extended or down-folded position in such manner as to prevent all rattling thereof or to secure it in any position between these points.

The invention is fully illustrated in the accompanying drawings, in which—

Figure 1 is a view of a vehicle-body in side elevation to which the improved wind-shield is applied, the shield being shown extended. Fig. 2 is a similar view, the shield being shown with the upper portion thereof folded down against the lower fixed portion of the shield. Fig. 3 is a vertical section of the shield, showing the upper portion thereof folded down against the lower fixed portion. Fig. 4 is a front elevation of one side of the shield in its extended position, showing the construction of the devices whereby the lower part of the shield is rigidly supported and the upper part of the shield is operated and secured. Fig. 5 is a vertical sectional view on line 5 5, Fig. 4. Fig. 6 is a cross-sectional view on line 6 6, Fig. 4, and illustrates more particularly the same construction and the manner of securing the brace thereto. Fig. 7 is a cross-section on the plane of line 7 7, Fig. 4, showing the nature of the construction of the fastening device for the end of a brace-rod.

Referring now to the drawings, $a$ indicates the vehicle-body of that type in connection with which the wind-shields are usually employed, the drawings representing in a conventional manner the body of a self-propelled road-vehicle provided with a hood $b$ at the forward end thereof, the wind-shield being erected in the plane of the rear end of said hood. In other types of vehicle it might be differently placed, and whatever may be the type of the vehicle the position of the wind-shield obviously would be such as to protect the operator or driver.

As shown in the various drawings, the shield consists of two frame parts $c$ and $d$, $c$ being the lower and rigidly-secured part of the shield and $d$ the upper or movable part thereof, the two being hinged together on hinges $e$, the line of division between the parts extending transversely thereof.

The lower edge of the fixed portion $c$ of the shield is indicated by the line $f$, Figs. 1, 2, and 3, 4, and 5, and below this line is a sort of a base-board, (indicated by $g$,) which is provided with legs $h$, as shown in Figs. 1 and 2, which extend down each side of the body of the vehicle through clips $j$, whereby this board is rigidly supported in a vertical plane in such position as to cut off the passage of any air-currents beneath it.

The frame $c$ is placed on this base-board, or the base-board may be permanently attached to the lower part of the frame, there being vertical rods $k$, as shown in Figs. 4 and 6, let into and secured to the outer edges of the base-board and let into grooves in the vertical edges of the part $c$ of the frame to rigidly support these members together in the same plane.

On each side, preferably, of the part $c$ of the shield is secured a clip $m$, which, as shown in Fig. 6, is U-shaped and embraces the edge of the frame and the rod $k$, and to this clip is secured the diagonally-disposed brace-rod $b$, preferably by means of a bolt $p$, as shown in Fig. 6, which extends through the clip and through the frame, as shown, and is secured thereto by a nut. The lower end of this brace-rod $o$ is secured to the sill of the vehicle-body at $q$ or other convenient place, and by means of this brace the part $c$ of the shield is rigidly held in vertical position, as shown in Figs. 1 and 2 particularly.

As hereinbefore stated, the upper frame part $d$ of the shield is hinged to the part $c$ and preferably in such position as to fold inwardly toward the seat, this movable part being maintained in extended position in the plane of the part $c$ by means of the brace-rods $r$, the lower ends of which are arranged to slide on the brace-rods $o$, the latter being provided with sleeves $s$, on one side of which is a set-screw $t$, whereby they may be secured in any position on the rod, and on the other side of which is a thumb-nut $v$, screw-threaded into a boss on the sleeve, said nut being provided with a tapered shank $w$, immediately under the head thereof, which fits closely in a similarly-tapered hole in the end of the brace-rod, which permits the latter to be secured in such manner as to preclude the possibility of rattling and at the same time rendering it unnecessary to set up the screw very hard to make it hold, the tapering fit of the screw making it very difficult to jar it loose by the vibration of the vehicle.

The upper end of the brace-rod $r$ is similarly secured by a nut $v'$ to a clip $m'$, which is secured to the edge of the part $d$ by screws, as shown, or in any other suitable way, the construction of this clip being shown in Fig. 7 in section in detail.

When the part $d$ is in extended position in the plane of the part $c$ of the shield, the brace-rod $r$ will be in substantial alinement with the brace-rod $o$, and while, of course, this alinement is unnecessary to the proper function of the parts it adds to the symmetrical appearance of the construction.

By reference to Fig. 4 particularly it is seen that the brace-rod $r$ is offset, as at $x$, by means of a curve therein, which will permit it to swing in a vertical plane outside of the edge of the part $c$ of the shield, this being rendered necessary because of the fact that the part $d$ of the shield swings in its downward movement from the vertical away from the brace-rod $o$.

It is quite obvious that the reversal of this movement of the part $d$ would be of easy accomplishment and for all practical purposes would be quite as effective if it swung in the opposite direction to a downward position, and to make such a change would be within the capacity of any mechanic, and such modified construction is entirely within the scope of the invention; but the preferred construction is that shown and described herein.

For purposes of finish the upper border of the part $c$ of the shield is incased with a brass cap $y$, U-shaped in cross-section and extending entirely across the upper part thereof, and the same finishing-strip is applied to the lower edge of the part $d$ of the shield.

It is obvious from the foregoing description that the construction of the part $d$ and the brace-rod $r$ renders it possible to adjust this part in any position desired, and if moved to horizontal position or a little below it it may serve as a shelf on which to locate a map for the guidance of the driver of the vehicle, if desired. To adjust this part $d$, the thumb-screw $v$ on the sleeve $s$ and $v'$ on the clip $m'$, together with the screw $t$, are loosened and the part $d$ then swung to any desired position, whereupon a retightening of these elements will secure it firmly in its adjusted position. In each of the frame parts $d$ and $c$ of the shield panes of glass $z$ are mounted in the usual manner.

Of course, if the nature of the construction of the vehicle-dashboard is such as to constitute a suitable base for the shield, the base-board $g$, described herein, might be omitted.

Having thus described my invention, what I claim, and desire to secure by Letters Patent of the United States, is—

1. A wind-shield for vehicles comprising a lower part supported on the vehicle, a brace therefor extending from the upper part thereof to the vehicle, an upper part arranged to swing relatively to said lower part, and a brace pivotally secured to the upper part and having a sliding connection with the brace for the lower part.

2. A wind-shield for vehicles comprising a lower part supported on the vehicle, a brace therefor connected at its upper end to the top of the lower part and at its lower end to the vehicle, an upper part arranged to swing relatively to said lower part, and a brace connected at one end to the upper part and having its other end connected to the brace of the lower part.

3. A wind-shield for vehicles comprising a base-board secured to the vehicle, a lower shield part secured to said base-board, a brace for said lower part extending from the upper end thereof to the vehicle, an upper shield part arranged to swing relatively to said lower part, and a brace pivotally secured to the upper shield part and having a sliding connection with the brace for the lower shield part.

4. A wind-shield for vehicles comprising a base-board secured to the vehicle in a substantially vertical plane, a lower shield part resting upon the upper edge of said base-board, a brace for said lower shield part extending from near the upper end thereof to the vehicle, an upper shield part hinged to the upper edge of the lower shield part, and a brace pivotally secured at one end to the upper shield part and adjustably connected at its other end to the brace for the lower shield part, whereby the upper shield part may be swung toward and from a position of alinement with said lower shield part.

5. A two-part wind-shield for vehicles comprising a lower part supported on the vehicle in a substantially vertical plane, a brace therefor extending from the upper part thereof to the vehicle, an upper part hinged to the upper edge of said lower part to swing toward and from a position of alinement with said lower part and above the latter, a brace pivotally secured by one end to the swinging part of the shield, and having a sliding connection with the brace of said lower part and means to secure the braces together.

6. A two-part wind-shield for vehicles comprising a base-board rigidly secured to the vehicle in a substantially vertical plane, a lower shield part fixedly secured to the upper edge of said base-board, and an upper shield part movable relative to said lower part to a position above the latter and constituting an extension thereof, and means to secure said upper part in its adjusted position.

7. A wind-shield for vehicles comprising a base-board secured to the vehicle in a substantially vertical plane, a lower shield part resting upon the upper edge of said base-board, a rod extending along the opposite side edges of the base-board and lower shield part, a clip straddling the rod and the edge of the upper shield part to hold the rod against the edge of said part, a brace secured at one end to said clip and at its other end to the vehicle, an upper shield part arranged to swing relatively to said lower shield part, and means to brace and adjust said upper shield part, substantially as specified.

GEO. W. KERR.

Witnesses:
 Wm. H. Chapin,
 K. I. Clemons.